(12) United States Patent
Krause

(10) Patent No.: US 9,844,863 B1
(45) Date of Patent: Dec. 19, 2017

(54) GASKET INSTALLER WRENCH AND METHOD

(71) Applicant: Evan J. Krause, Plainfield, IL (US)

(72) Inventor: Evan J. Krause, Plainfield, IL (US)

( * ) Notice: Subject to any disclaimer, the term of this patent is extended or adjusted under 35 U.S.C. 154(b) by 305 days.

(21) Appl. No.: 14/694,374

(22) Filed: Apr. 23, 2015

(51) Int. Cl.
*B23P 19/04* (2006.01)
*B25B 27/00* (2006.01)
*B25B 13/54* (2006.01)
*B23P 19/08* (2006.01)

(52) U.S. Cl.
CPC .......... *B25B 27/0028* (2013.01); *B25B 13/54* (2013.01); *B23P 19/084* (2013.01)

(58) Field of Classification Search
CPC .. B23P 19/047; B23P 19/084; B25B 27/0028; B25B 13/54

USPC ................... 81/124.2, 119, 486, 112, DIG. 7
See application file for complete search history.

(56) References Cited

U.S. PATENT DOCUMENTS

| 4,535,521 A | 8/1985 | VerPlanck |
| 4,779,441 A | 10/1988 | Pringle |
| 5,068,953 A | 12/1991 | Semotiuk |
| 5,216,793 A | 6/1993 | Semotiuk |
| 2010/0330536 A1* | 12/2010 | Mullaly ............ B25B 27/0028 433/201.1 |

\* cited by examiner

*Primary Examiner* — Christopher Besler
(74) *Attorney, Agent, or Firm* — Mathew R. P. Perrone, Jr.; Joseph J. Whang

(57) ABSTRACT

A gasket installer wrench provides a grasping collet, which extends out of the remover end and clips onto the small ball end of a valve core. The gasket installer guide or wrench is especially suitable for use with a refrigerant valve or tire valve, or to install a valve depressor.

1 Claim, 11 Drawing Sheets

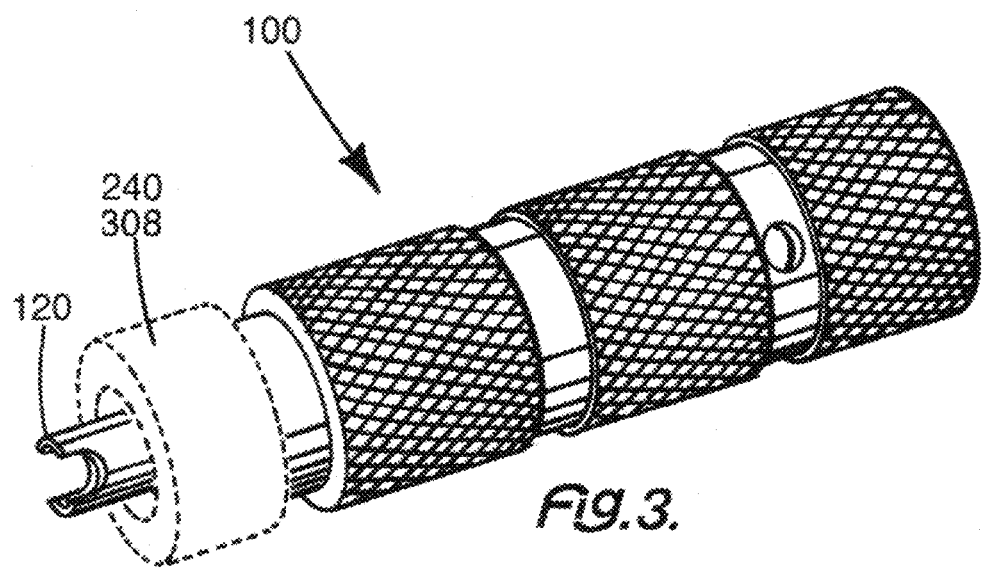
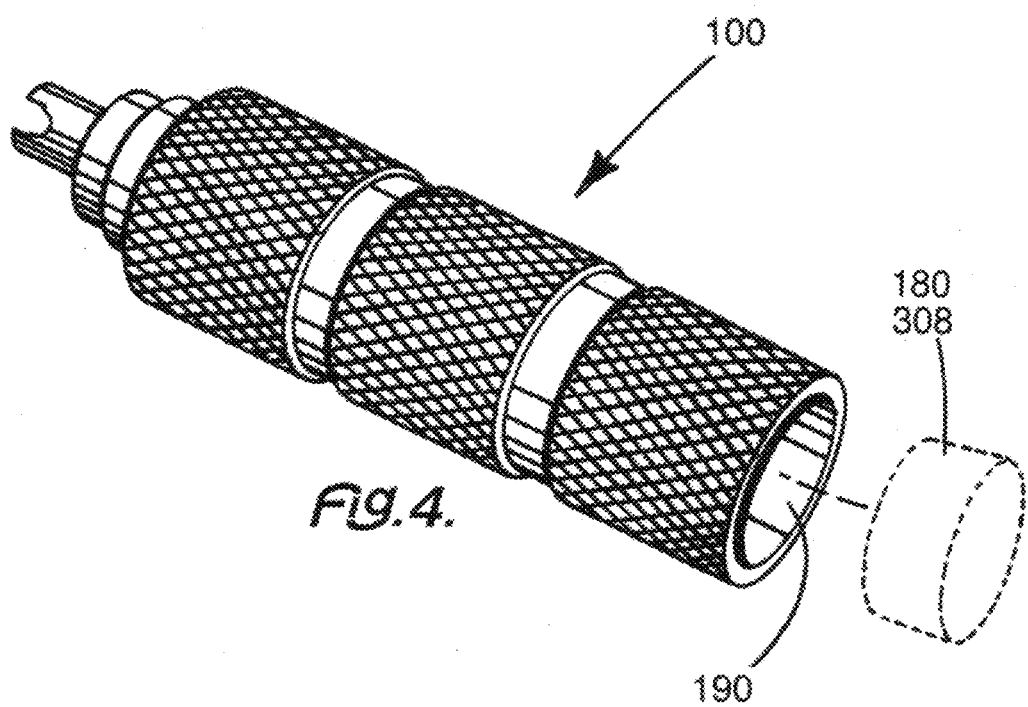

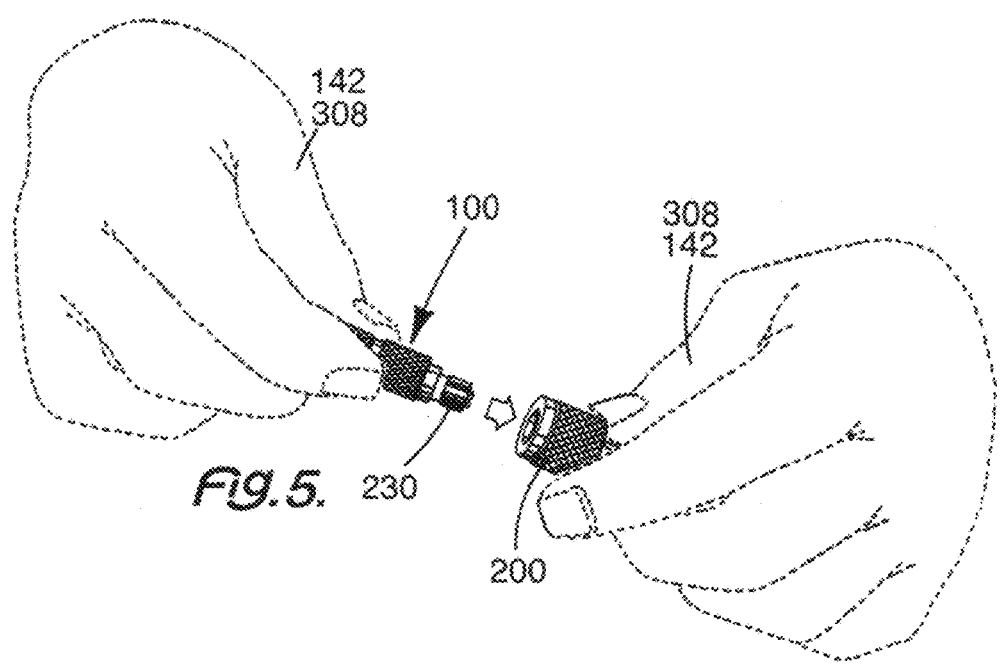
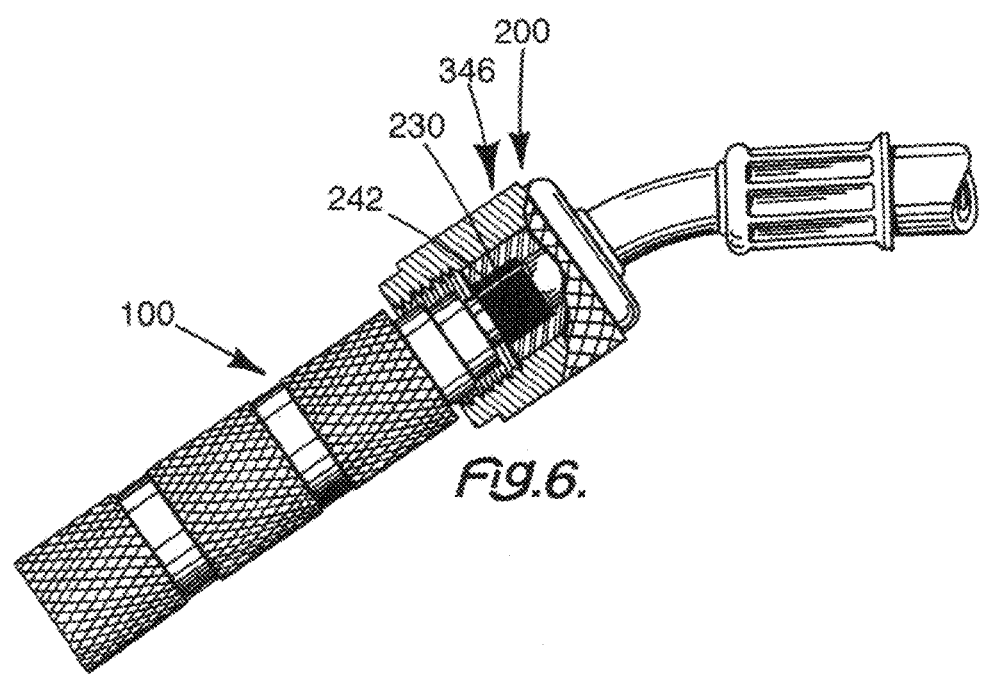

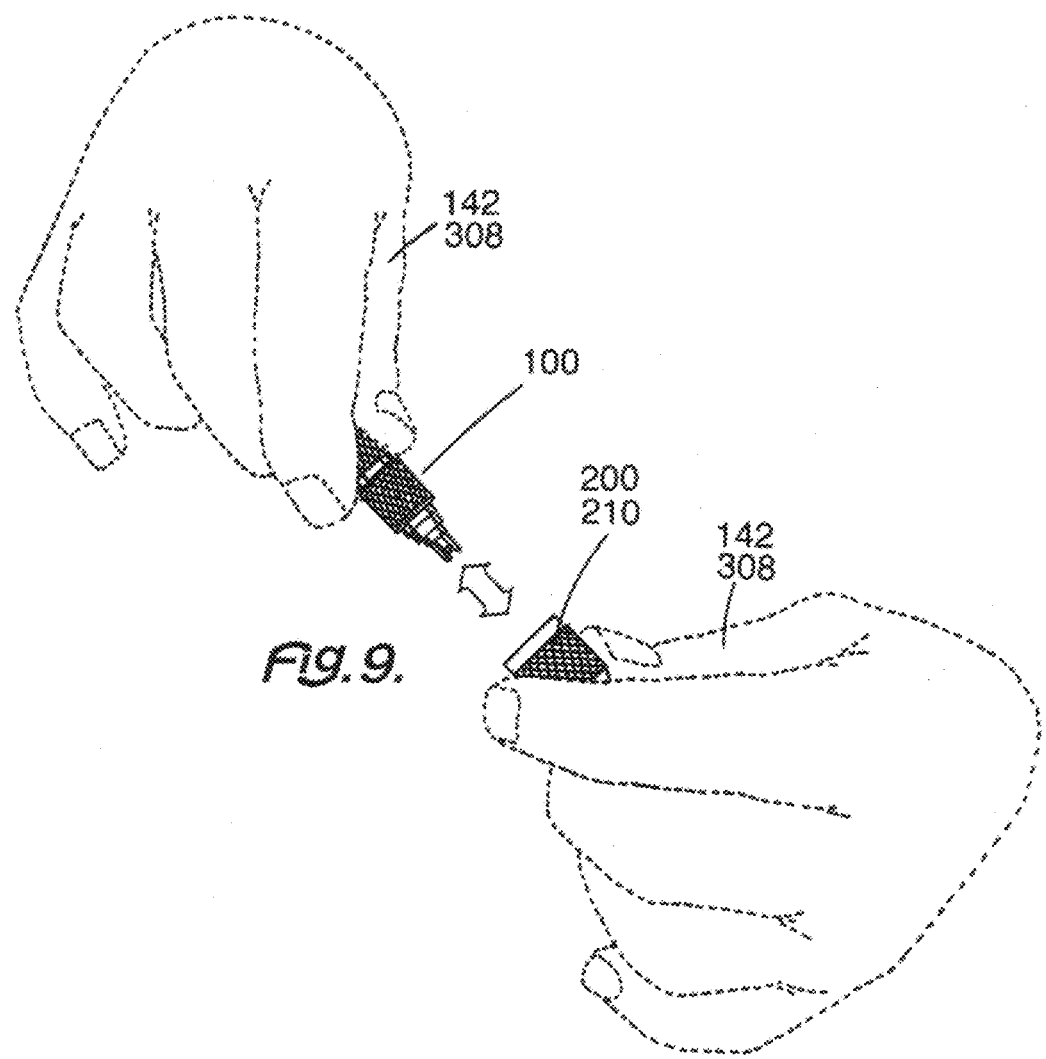

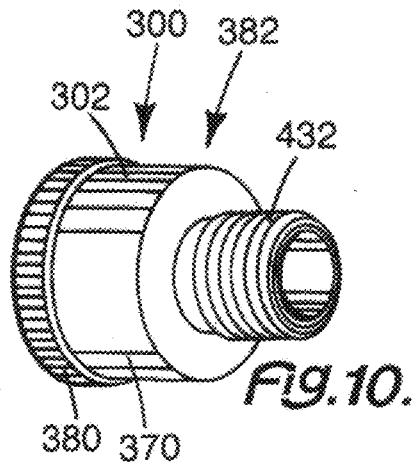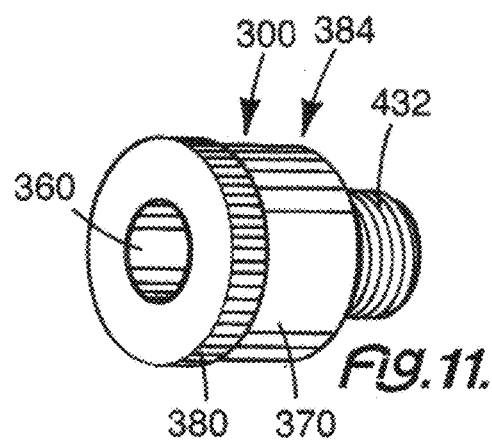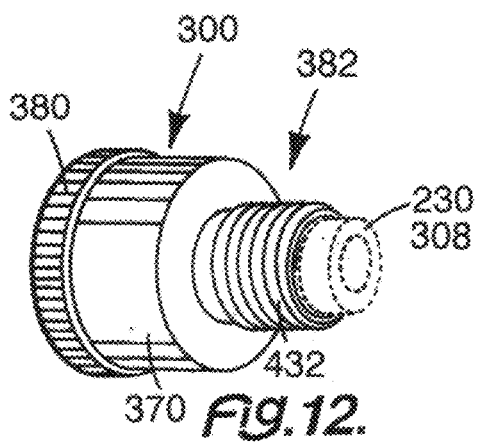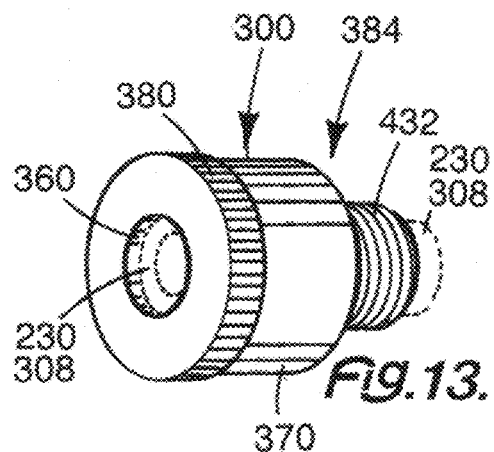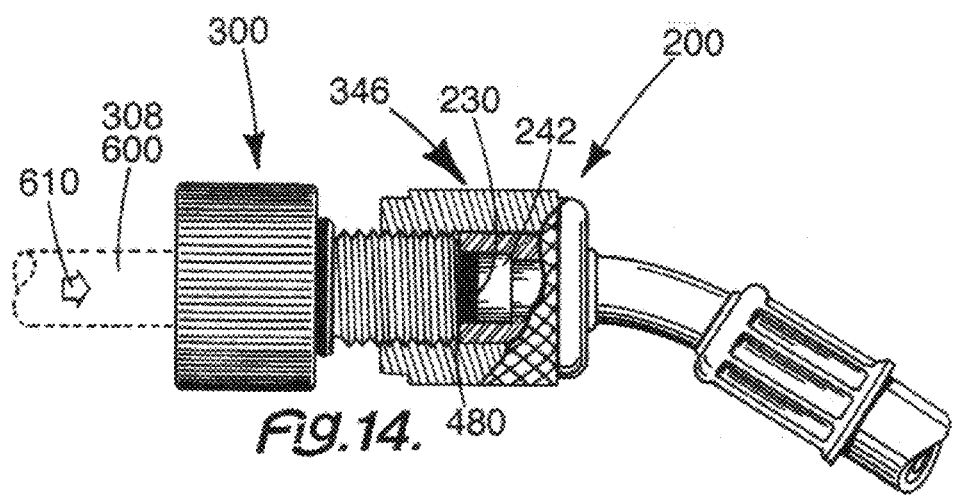

GASKET INSTALLER WRENCH AND METHOD

This invention relates to a gasket installer wrench, and more particularly, to a gasket installer wrench for removing a valve core from a tire valve or a refrigeration valve, or inserting a valve core into a tire valve or a refrigeration valve.

BACKGROUND OF THE INVENTION

In a refrigeration system, various types of hoses are in common use. Typically, such a hose has a male or female fitting on an end thereof. The bidding on each end may be two male fittings, two female fittings, or a male fitting and a female fitting on opposing ends of the hose.

A service technician deals with compound gauge hoses. These hoses come in multiple lengths and generally are color coded. With the color coding, the technician is able to determine if a hose is a low side hose or a high side hose or the charge hose. The gaskets found in these hoses are required to prevent leakage from the hose and keep the desired refrigerant or other fluid within refrigeration device or system.

Sometimes a gasket gets blown out of the hose, whether it is done by accidental, by equipment malfunction or by another circumstance. A gasket can also get torn or ripped, or just wear out. Whenever a gasket fails to meet its required duty, it needs to be replaced.

Due to the tight fitting of the gasket within the hose, it can be very difficult to replace the gasket. It is quite common to ruin more than one new gasket in an attempt to replace an old gasket with a defect, which prevents the hose from working properly. If a device or tool can be developed to facilitate insertion of a new gasket within a hose, great savings of time and gasket expense can occur.

A common tool is designed to only install one size gasket when more than one size gasket is standard in the air conditioning or refrigeration industry. The container is also only designed to hold one size gasket.

The overall shape of this service tool makes it difficult to store within a pocket of a tool bag making it less accessible when needed for use. Most tool bag pockets are designed for rounded tools such as screw drivers or for plier handles. While the service tool is used by an actual service technician trained to fix air conditioning systems and refrigeration system, it is likely that the technician tends to place this tool in a coat pocket or a pants pocket. The points of the common prior art device are dangerously sharp making reaching into that pocket for the tool a very hazardous situation.

It is still far less expense to replace the gasket than it is to replace the hose. Yet, nobody sells a tool, which facilitates replacement of a gasket in a hose. Thus, it becomes clear that it is very desirable to have a tool which facilitates replacement of the gaskets in a hose. A gasket installer wrench needs to be more practical, less expensive to manufacture, extremely useful and easier to use.

SUMMARY OF THE INVENTION

Among the many objectives of the present invention is the provision of a gasket installer wrench capable of inserting a gasket into a hose.

Another objective of the present invention is the provision of a gasket installer wrench capable of servicing a hose for a refrigerant system.

Yet another objective of the present invention is the provision of a gasket installer wrench capable of guiding a gasket into the proper position.

Still another objective of the present invention is the provision of a gasket installer wrench, which can be releasably secured to a valve core.

Also, an objective of the present invention is the provision of a gasket installer wrench capable of reducing the number of gaskets required to achieve a proper replacement insertion.

A further objective of the present invention is the provision of a gasket installer wrench capable of reducing injury to the service technician.

A still further objective of the present invention is the provision of a gasket installer wrench capable of manufactured from different materials.

These and other objectives of the invention (which other objectives become clear by consideration of the specification, claims and drawings as a whole) are met by providing a gasket installer wrench capable of providing a grasping collet, that extends out of the remover end and clips onto the small ball end of a valve core.

BRIEF DESCRIPTION OF DRAWINGS

FIG. 3 depicts a large hose gasket 240 shown with phantom lines 308 mounted on gasket installer wrench 100 of this invention.

FIG. 4 depicts a rear perspective view of gasket installer wrench 100 of this invention showing storage cavity 190 with optional storage plug cap 180 shown with phantom lines 308.

FIG. 5 depicts a hand 142 shown with phantom lines 308 holding gasket installer wrench 100 of this invention with small hose gasket 230 mounted thereon as it is about to be installed into small hose coupling 200 held by hand 142 shown with phantom lines 308.

FIG. 6 depicts a partially cross-sectioned view of small hose coupling 200 with gasket installer wrench 100 of this invention installing small hose gasket 230 in place.

FIG. 9 depicts a gasket installer wrench 100 of this invention being removed from either small hose coupling 200 or large hose coupling 210.

FIG. 10 depicts a front perspective view 382 of small gasket installer guide tool 300 of this invention showing small male threads 432, imprint area 370 and grip area 380.

FIG. 11 depicts a rear perspective view 384 of small gasket installer guide tool 300.

FIG. 12 depicts a front perspective view 382 of small gasket installer guide tool 300 showing small male threads 432, imprint area 370 and grip area 380 and small hose gasket 230 shown with phantom lines 308, being ready for use.

FIG. 13 depicts a rear perspective view 384 of small gasket installer guide tool 300 with small hose gasket 230 shown with phantom lines 308, being able to store spare gaskets.

FIG. 14 depicts a partially cross-sectioned view of small hose coupling 200 with small hose gasket 230 being installed using small gasket installer guide tool 300.

Throughout the figures of the drawings, where the same part appears in more than one figure of the drawings, the same number is applied thereto.

DESCRIPTION OF THE PREFERRED EMBODIMENTS

Figure 1:
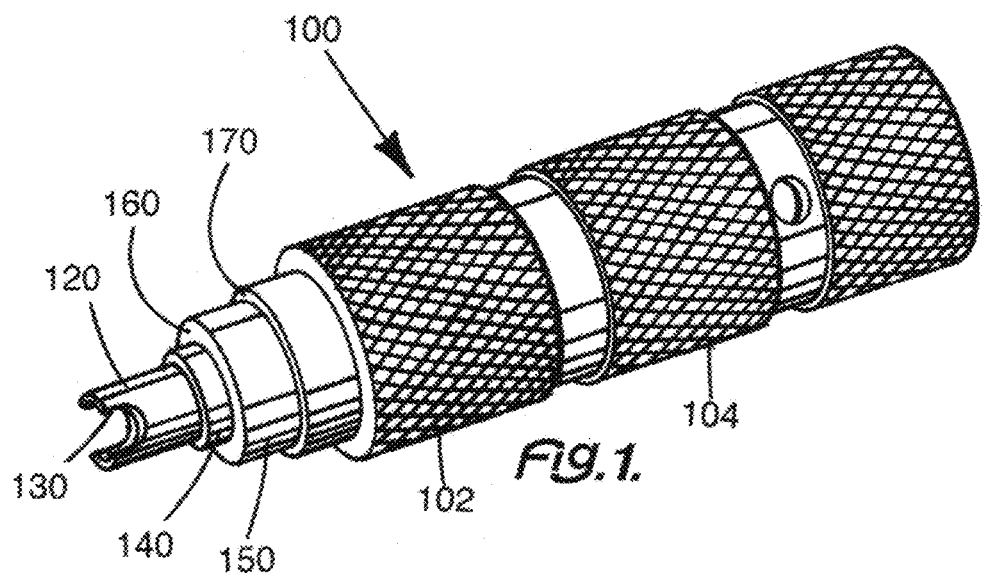
FIG. 1 depicts a front perspective view of a gasket installer wrench 100 of this invention showing the cooperative core wrench 120, a tapered small gasket saddle 140 and a tapered large gasket saddle 150.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

The gasket installer guide or wrench of this invention is useful in many ways. It is especially suitable for use with a refrigerant valve or tire valve, or to install a valve depressor. The gasket installer wrench of this invention may also be used with high-pressure tire, after the appropriate modifications are made. From the gasket installer wrench, a grasping, collet extends from one end of the gripper device and attaches to an end of the valve core. Typically, this gripper device can be applied to a Schraeder valve core or a tire valve core. The gasket installer wrench has a housing, from which important elements cooperate to complete the gasket installer wrench. The collet extends from one end of that housing to grip the valve core. At the other end thereof is an appropriate gripping device such as a ring.

The overall thin long rounded shape of this gasket installer wrench makes it more ergonomically designed for use and storage. It can be stored in a tool bag pocket making it more accessible when needed. If this gasket installer wrench is stored in a pants pocket, it is far less hazardous when one reaches into that pocket for it. The shape of the container is easier to store away. The hex shape on the sides of the gasket installer wrench keeps it from rolling away. The flat bottom of the container allows container to be stood up when using the service tool or gasket installer wrench.

Anyone working in the air conditioning and refrigeration service repair industry will use this tool quite often because of the larger storage capacity container incorporated into the design and the unique operation of the main fitting of the service tool.

The gasket installer guide or wrench of this invention is more practical, less expensive to manufacture and extremely useful and easier to use. The design for these tools can be formed out of metal, plastic, composite materials, or reasonable mixtures or combinations thereof, making this improved service tool less expensive to manufacture. If this gasket installer wrench is made out of plastics or composites, it becomes lighter to carry, which in turn lightens the load a service technician carries while performing the job.

In a refrigeration hose, it is an industry standard for all refrigeration gaskets to be made of Neoprene material because of its chemical resistance and wear ability. It is a fact that Neoprene never stops hardening making complete removal of all old gaskets in one piece not possible. Over time, they begin to crumble apart making gasket removal difficult. If a gasket crumbles during removal, then another tool is required to complete removal of all the broken gasket fragments. A good tool for this is a small screw driver. All service technicians will have a small screw driver or a pick of some kind in their tool bag or box to remove the gasket, especially a crumbling gasket.

Turning now to FIG. 1, FIG. 2, FIG. 3 and FIG. 4, a gasket installer wrench 100 of this invention has a housing 102 an optional cooperative core wrench 120, a tapered small gasket saddle 140 and a tapered large gasket saddle 150. Small basel 60 forms part of small gasket saddle 140 and is adjacent to core wrench 120. Large base 170 forms part of large gasket saddle 150 adjacent to large gasket saddle 150 and oppositely disposed from small base 160.

The core wrench 120 is preferably removably attached to the gasket installer wrench 100. The core wrench 120 includes a core gripper 130 for a valve core, also known as a valve stem (not shown). The valve core wrench, such as core wrench 120, is used to install or remove valve cores, which are industry standard in air conditioning and refrigeration systems.

At one end of housing 102 is the tapered small gasket saddle 140. This design may or may not include a core wrench 120. This gasket installer wrench 100 can also be on the end of a screwdriver or the like. This gasket installer wrench 100 can be made out of plastic or composite material. In FIG. 1, gasket installer wrench 100 is made out of metal. It can be made to install only one size gasket or multiple size gaskets. In this drawing, this tool can install two different sized gaskets since these are most common sizes used by a service man. Three or more sizes can be incorporated into the design by increasing tool diameter. The housing 102 can also include a knurled surface 104 to increase a grip of the gasket installer wrench 100.

Figure 2:
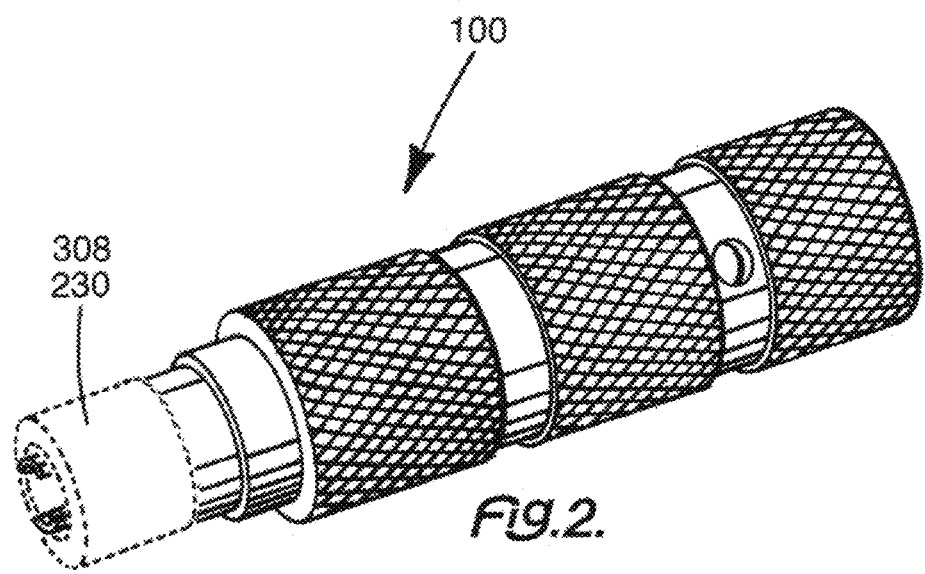
FIG. 2 depicts a small hose gasket 230 shown with phantom lines 308 mounted on gasket installer wrench 100 of this invention.

In FIG. 2 small gasket 230 is shown with phantom lines 308 adjacent to tapered small gasket saddle 140, which is adjacent to small gasket base 160. Small gasket base 160 expands into tapered large gasket saddle 150. Large gasket saddle 150 terminates at large gasket base 170. The taper of small gasket saddle 140 and large gasket saddle 150 facilitates placing the appropriate sized gasket thereon. With the small gasket saddle 140 cooperating with the small gasket base 160, and large gasket saddle 150 cooperating with the large gasket base 170, the horizontal axis and the vertical axis of any gasket can be adjusted and greatly facilitate the insertion of a new gasket into a hose.

The small (usually Neoprene) refrigerant hose gasket 230 is installed over core gripper 130 and core wrench 120 and pushed over small gasket saddle 140 and seated against small gasket base 160. Small gasket saddle 140 contacts the inside wall of the small hose gasket 230 and keeps the gasket 230 in vertical or parallel alignment with the tool. Small gasket base 160 contacts the end of the small hose gasket 230 thereby providing both a horizontal surface for alignment and to push gasket 230 into the gasket cavity 242 (FIG. 6).

The walls of small gasket saddle 140 may have an incline to allow for use with various different manufactured small hose gaskets 230. There is a lot of variance in internal size of small hose gaskets 230 from manufacturer to manufacturer of small refrigerant hose gaskets 230. The size of small gasket saddle 140 is optimized to work with many different small gaskets 230. Small gasket saddle 140 is made with a diameter a little larger than the inside diameter of small gasket 230.

Contact of small gasket saddle 140 to the inside of the small gasket 230 is minimized so to limit the amount of friction used to retain the gasket 230 onto the gasket installer wrench 100. Having small gasket saddle 140 inclined or tapered will further reduce friction. Gaskets stretch slightly over small gasket saddle 140 making them stay onto the end of the tool ready for easy installation into the refrigerant hose cavity 242 in FIG. 6 due to relative differences in friction.

Then FIG. 3 depicts a large hose gasket 240 shown with phantom lines 308 properly mounted on gasket installer wrench 100 of this invention and ready for installation into large hose coupling 210 (shown in FIG. 7) such as a refrigerant hose fitting. In this manner, it becomes clear that gasket installer wrench 100 can be used to install large refrigerant hose gaskets 240. One places a large gasket 240 over core wrench 120 and push it down over large gasket saddle 150 until the end of the large gasket 240 contacts surface of the large gasket base 170.

The walls of large gasket saddle 150 may have an incline to allow for use with various different manufactured large gaskets 240. Large gasket saddle 150 contacts interior of gasket and with friction retains large gasket saddle 150 to the gasket installer wrench 100 and provides a vertical alignment of the refrigerant hose gasket 240. Since large gasket saddle 150 is inclined or tapered, it has less friction with large gasket 240.

Now FIG. 4 depicts a rear perspective view of gasket installer wrench 100 of this invention showing storage cavity 190 in housing 102 (FIG. 1) with optional storage plug cap 180, shown with phantom lines 308 used to close the storage cavity 190 as desired. Gasket installer wrench 100 can also be used as a container 190 with a lid or cap 180 shown with phantom lines 308.

With FIG. 5, hand 142 is shown with phantom lines 308 holding gasket installer wrench 100 of this invention with small hose gasket 230 mounted thereon as it is about to be installed into small hose coupling 200 held by hand 142 shown with phantom lines 308. In fact, two hands 142 are using gasket installer wrench 100 to appropriately install small gasket 230 into small hose coupling 200. The small hose coupling 200 is the most common sized coupling in use in the air conditioning or refrigeration industry. Also, small hose coupling 200 is commonly used in the automotive industry.

Because FIG. 6 depicts a partially cross-sectioned view of small hose coupling 200 as coupling cut-away 346 with gasket installer wrench 100 of this invention, installing small hose gasket 230 in place becomes simple. Small gasket 230 is being fully installed into the small refrigerant hose coupling 200. The outside surface of the hose gasket 230 contacts the inside surface of the gasket cavity 242 and has more friction than the tool surface of the small gasket saddle 140 has with the inside of the hose gasket 230, thereby causing the hose gasket 230 to stay in the gasket cavity 242, when gasket installer wrench 100 is removed from small refrigerant hose coupling 200.

Figure 7:
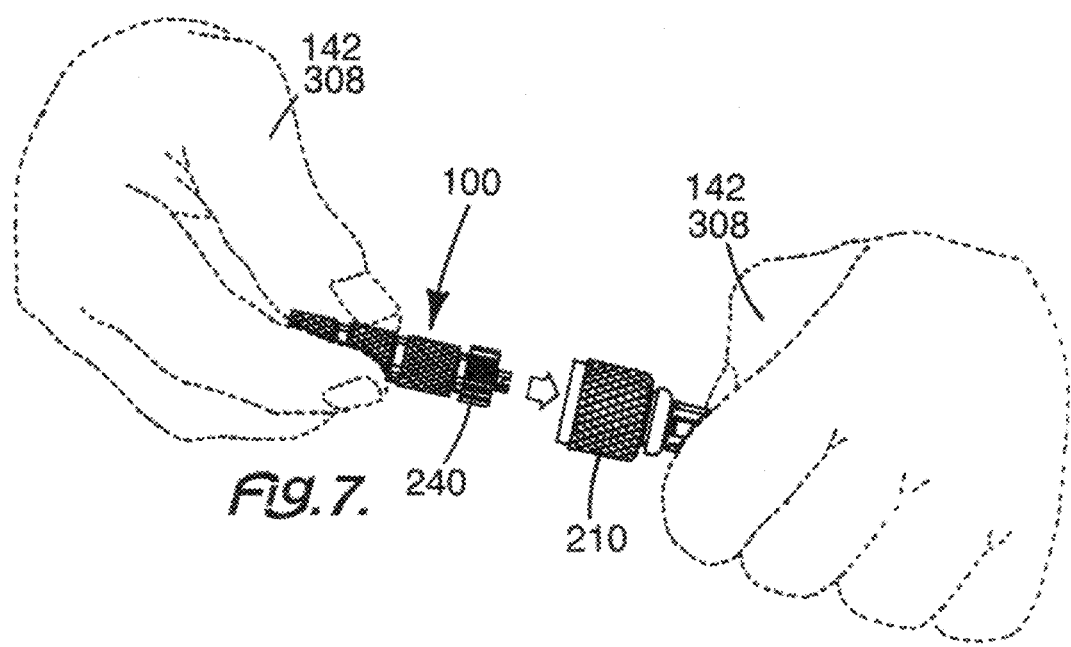
FIG. 7 depicts a hand 142 shown with phantom lines 308 holding gasket installer wrench 100 of this invention with large hose gasket 240 mounted on it as it is about to be installed into large hose coupling 210.

With FIG. 7, two hands 142 shown in phantom lines 308 are being used with gasket installer wrench 100 to install a large hose gasket 240 into refrigerant hose coupling 210. The gasket installer wrench 100 of this invention with the large hose gasket 240 mounted thereon functions as above-described as it is about to be installed into large hose coupling 210.

Figure 8:
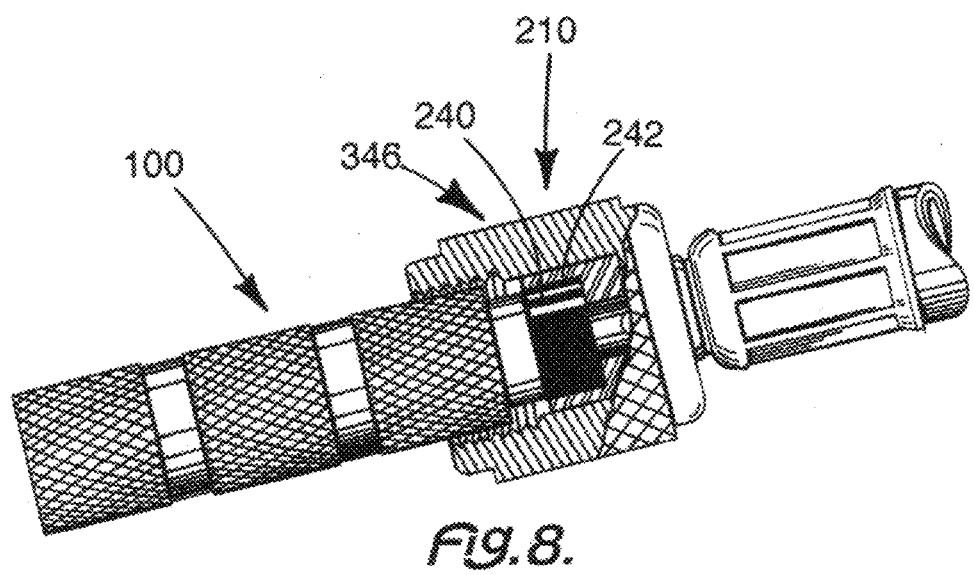
FIG. 8 depicts a partially cross-sectioned view of large hose coupling 210 with gasket installer wrench 100 of this invention installing large hose gasket 240 in place.

Since FIG. 8 has a partially cross-sectioned view of large hose coupling 210 as coupling cut-away 346 with gasket installer wrench 100 of this invention installing large hose gasket 240 in place, the advantages of gasket installer wrench 100 become even clearer. Large gasket 240, with proper vertical and horizontal alignment, is being fully inserted into the gasket cavity 242 located in the straight large refrigerant hose coupling 210. The outside surface of the hose gasket 240 contacts the inside surface of the gasket cavity 242 and has more friction than the gasket installer wrench 100 surface 150 has with the inside of the large gasket 240, thereby causing the large gasket 240 to stay in the gasket cavity 242 when gasket installer wrench 100 is removed from the large hose coupling 210.

As FIG. 9 shows two hands 142 removing gasket installer wrench 100 after use, its versatility becomes clear. Gasket installer wrench 100 works well with either a small refrigerant hose coupling 200 or a large refrigerant hose coupling 210 after installing a small hose gasket 230 (FIG. 2) or large hose gasket 240 (FIG. 3) into the respective hose coupling.

To adjust for sizes, FIG. 10, FIG. 11, FIG. 12, FIG. 13 and FIG. 14 shows small gasket installer guide tool 300. From a front perspective view 382 in FIG. 1, small gasket installer guide tool 300 is another version of and is based on gasket installer wrench 100 of FIG. 1. Small gasket installer guide tool 300 has a support housing 302 with small male threads 432 at one end, imprint area 370 between the small male threads 432 and the grip area 380. Small grip area 380 is at the end of support housing 302 oppositely disposed from small male threads 432.

Small gasket installer guide tool 300 is designed to be manufactured out of plastic which will make it very inexpensive to produce. Yet metal or composite material is also operable for small gasket guide 300. Grip area 380 has a knurled surface 104 (FIG. 1) to increase grip for twisting small gasket guide 300 into small hose coupling 200 (FIG. 14). Imprint area 370 is a smooth surface where a company logo or other design can be prominently displayed.

FIG. 11 provides a rear perspective view 384 of FIG. 10 for small gasket installer guide tool 300. A storage magazine 360 for gaskets in small gasket installer guide tool 300 is centrally located by the grip area 380. FIG. 12 and FIG. 13 cooperate with FIG. 10 and FIG. 11, to show how a gasket 230 is placed at either end of storage magazine 360, which is on an axial aperture of small gasket installer guide tool 300.

FIG. 12 as a front perspective view 382 and FIG. 13 as a rear perspective view 384 combine to show small hose gasket 230 being placed into storage magazine 360 in preparation for installation of a gasket into small hose coupling 200 (FIG. 5) or large hose coupling 210 (FIG. 7).

FIG. 13 demonstrates gasket guide tool 300 being used to store extra gaskets. The internal diameter of storage magazine 360 is smaller than the external diameter of small hose gasket 230. This small gasket installer guide tool 300 showing small male threads 432, imprint area 370 and grip area 380 and small hose gasket 230 shown with phantom lines 308. FIG. 13 is based on FIG. 11.

FIG. 14 with a partially cross-sectioned view of small hose coupling 200, has small hose gasket 230 being installed using small gasket installer guide tool 300. Gasket 230 is installed into the gasket cavity 242 of refrigerant hose coupling 200 with the cooperation of a pushing tool 600 or plunger 462 (shown in FIG. 23). The small coupling female threads 480 in the hose coupling 200 cooperate with small male threads 432 to hold a desired gasket in perfect alignment with the gasket cavity 242. Then an appropriate pushing tool 600 as a substitute for plunger 462 can push a gasket into positon from either end of storage magazine 360.

The aperture provided by storage magazine 360 can provide a perfect alignment of the gasket 230 through that aperture and directly into the gasket cavity 242. Thus, storage magazine 360 can also serve as a gasket guide aperture, from where a gasket 230 is placed in at either end thereof and then pushed with a pushing tool 600, thereby exerting push motion direction 610 shown by an arrow. The storage magazine 360 can provide a perfect alignment of any gasket, such as small hose gasket 230 or large hose gasket 240, thru the aperture of storage magazine 360 and directly into the gasket cavity 242. The storage magazine 360 can also serve the same function as the storage cavity 190 of FIG. 4.

Figure 15:
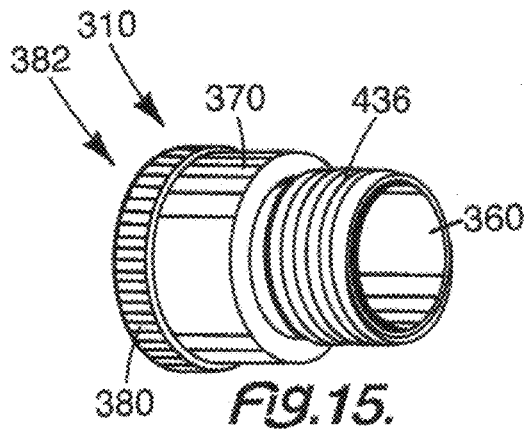
FIG. 15 depicts a front perspective view 382 of large gasket guide tool 310 showing small male threads 432, imprint area 370 and grip area 380.
Figure 16:
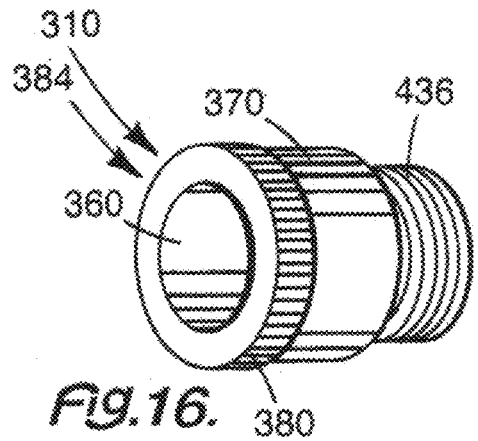
FIG. 16 depicts a rear perspective view 384 of large gasket guide tool 310.

In FIG. 15, a front perspective view 382 of large gasket guide tool 310 showing large male threads 436, imprint area 370 and grip area 380. In FIG. 16 is depicted a rear perspective view 384 of the large gasket guide tool 310. It is designed to be manufactured out of plastic, which will make the large gasket guide tool 310 very inexpensive to produce. However, metal or composite material is operable.

Grip area 380 includes a knurled surface 104 (FIG. 1) to increase the grip for twisting large gasket guide tool 310 into large hose coupling 210. Imprint area 370 provides a smooth surface, where a company logo or other design can be prominently displayed. Large male threads 436 on large gasket guide tool 310 cooperate with large hose coupling 210 (FIG. 19) and the large coupling female threads 482 thereof. Storage magazine 360 is an aperture that extends all the way thru the large gasket guide tool 310.

A large hose gasket 240 can be placed in the storage magazine 360 at either end of large gasket guide tool 310. After the large gasket guide tool 310 is screwed into large hose coupling 210, the gasket 240 can be pushed with a plunger 462 (FIG. 19) into the gasket cavity 242. Storage magazine 360 holds gasket 240 in perfect alignment with the gasket cavity 242 and simplifies gasket insertion therein.

Figure 17:
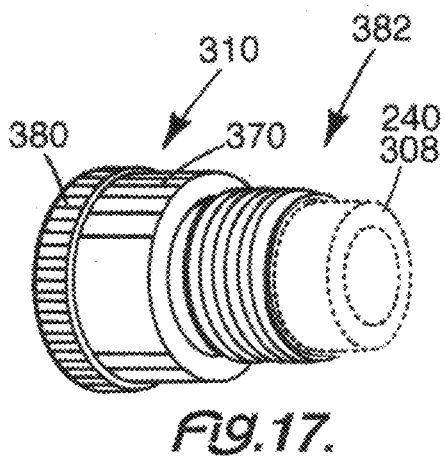
FIG. 17 depicts a front perspective view 382 of large gasket guide tool 310 showing small male threads 432, imprint area 370 and grip area 380 and large hose gasket 240 shown with phantom lines 308.
Figure 18:
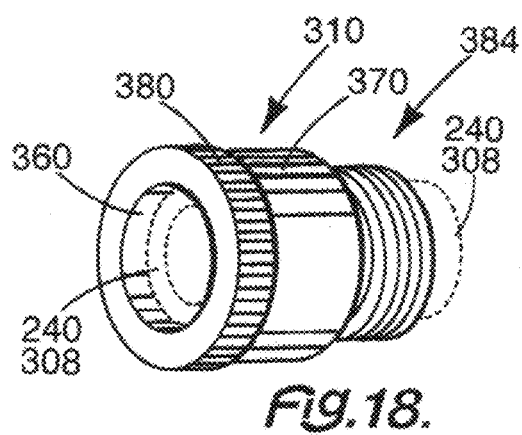
FIG. 18 depicts a rear perspective view 384 of large gasket guide tool 310 with large hose gasket 240 shown with phantom lines 308 ready for installation.

FIG. 17 and FIG. 18 depicts a front perspective view 382 and a rear perspective view 384 respectively of large gasket guide tool 310 showing large male threads 436, imprint area 370 and grip area 380 and large hose gasket 240 shown with phantom lines 308. FIG. 18 also shows large gasket guide tool 310 being used to store spare large gaskets 240, shown with phantom lines 308.

Figure 19:
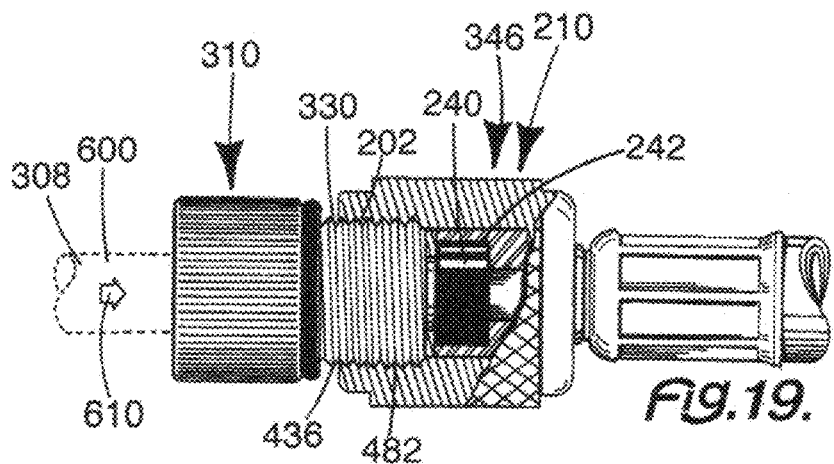
FIG. 19 depicts a partially cross-sectioned view of large hose coupling 210 with large hose gasket 240 being installed using large gasket guide tool 310.

FIG. 19 shows large hose gasket 240 being installed into the gasket cavity 242 of a hose coupling 210 with cooperation of a large gasket cradle 458 in the partially cross-sectioned view with large hose gasket 240 being installed using large gasket guide tool 310. Large male threads 436 provide alignment threads 330 for large gasket guide tool 310 to the large female threads 482 of large hose coupling 210. Pushing tool 600 thereby exerts push motion direction 610 shown by an arrow on large hose gasket 240. Both large gasket guide tool 310 and plunger 462 have inclined or tapered sides to reduce friction.

Figure 20:
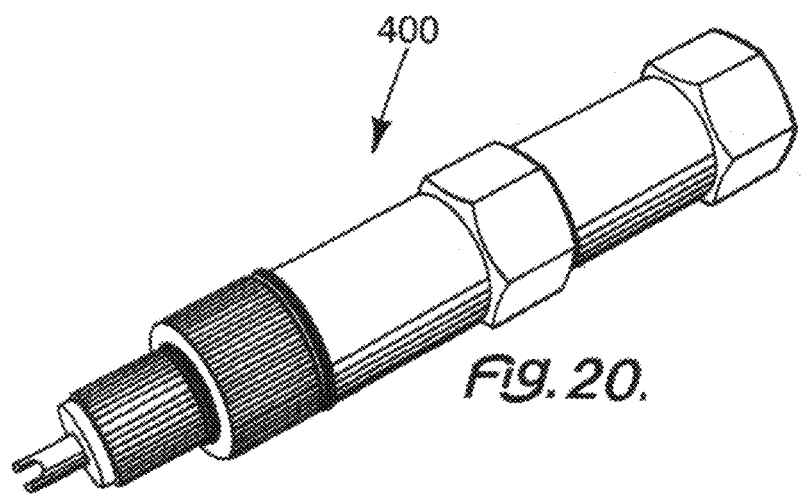
FIG. 20 depicts a front perspective view 384 of multi-faceted tool 400.
Figure 21:
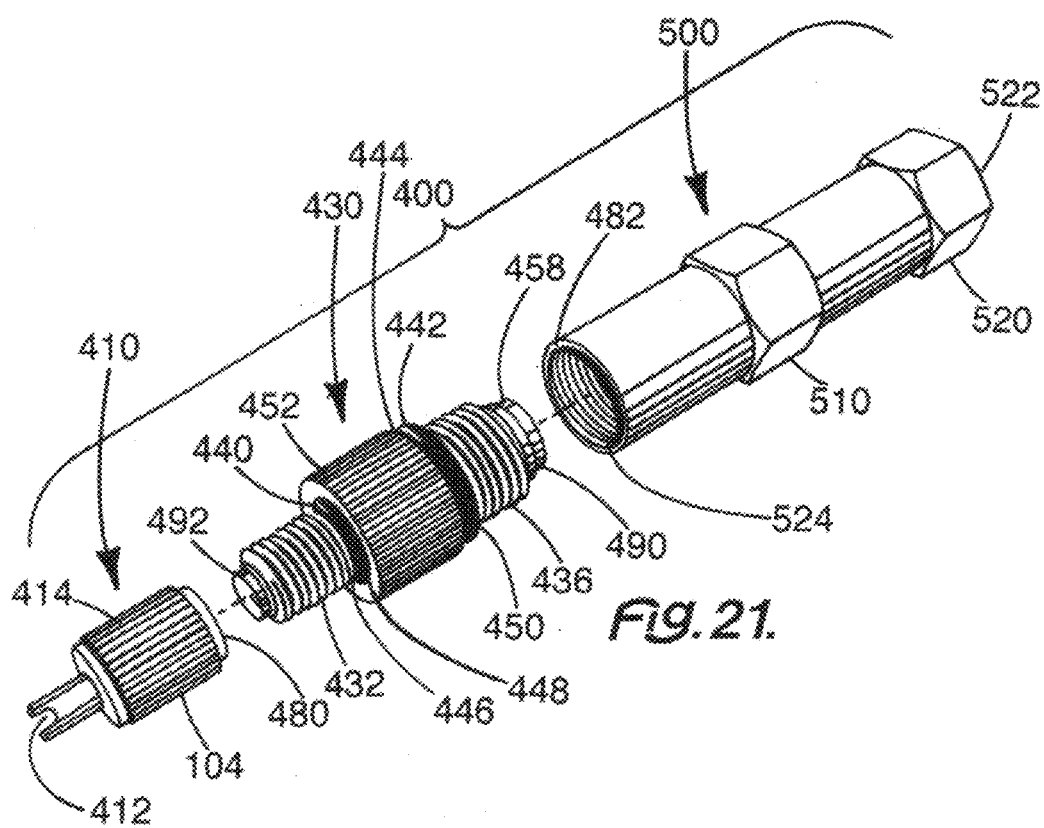
FIG. 21 depicts an exploded view of multi-faceted tool 400 with its three component systems valve insert wrench 410, gasket installer guide 430 and handle 500.

Turning now to FIG. 20 and FIG. 21, multi-faceted tool 400 is assembled (FIG. 20) and exploded (FIG. 21). Multi-faceted tool 400 has three components with valve insert wrench 410, gasket installer guide 430 and a handle 500. Handle 500 can also include a container 190, like that of FIG. 4. Valve insert wrench 410 can also install the depressor 532 of FIG. 25.

Multi-faceted tool 400 has insert coupling 412, which has a preferably rounded shape to improve strength of the insert coupling 412. This insert coupling 412 is sometimes needed to remove a valve core during servicing air conditioning or refrigeration equipment or install the depressor 532 of FIG. 25. Insert twist gripper 414 supports the insert coupling 412 and has a knurled surface 104 (FIG. 1) to allow for a better grip of valve insert wrench 410 while mounting the same on or removing the same from gasket installer guide 430. Gasket installer guide 430 has knurled gripping surface 452, with knurling 104 (FIG. 1) to facilitate gripping. Large gasket cradle 458 by large male threads 436 also facilitates gasket installation. Large gasket seat 490 supports large gasket 240 on large gasket cradle 458.

The multi-faceted tool 400 has a valve insert wrench 410 held in place by an insert coupling 412. An insert twist gripper 414 provides a good gripping surface to permit small coupling female threads 480 to receive gasket installer guide 430 at the small male threads 432 at one end thereof. Large male threads 436 on gasket installer guide 430 are oppositely disposed from the small male threads 432 at an end thereof.

Small o-ring stop 440 on multi-faceted tool 400 is positioned over small male threads 432 and adjacent to insert twist gripper 414. Small o-ring stop 440 thus receives small o-ring 448 in small o-ring cradle 446. Large o-ring stop 442 is positioned on twist gripper 414 at large male threads 436 and receives large o-ring 444 in large o-ring cradle 450. Plunger 462 is supported in gasket installer guide 430 as seen from large male threads 436.

Middle twist knuckle 510 or end twist knuckle 520 on handle 500 facilitates attaching or separating various parts. End twist knuckle 520 is at the end of handle 500 adjacent to the flat end 522 thereof. Middle twist knuckle 510 is spaced from handle 500, preferably at about the middle thereof for the same reason.

Gasket installer guide 430 is the main fitting of the multi-faceted tool 400. Small male threads 432 cooperate with small coupling female threads 480. Small male threads 432 also cooperate with small hose coupling 200 (FIG. 5) and the female coupling threads 202 thereat. The male threads 436 cooperate with female threads 482 of the handle 500. O-ring 440 contacts valve insert wrench 410 and keeps valve insert wrench 410 from vibrating loose as well as keeping water out of valve insert wrench 410.

Large o-ring 444 contacts handle 500, thereby avoiding a loosening vibration and also keeping water out of container or storage cavity 190 (FIG. 4) in handle 500. Installer twist gripper 452 has a knurled surface 104 to improve the grip for twisting the main fitting of gasket installer guide 430. Small gasket collar 492 is located at the small end of the plunger 462. Plunger 462, as in FIG. 23, has two functions. One function is to push plunger 462 while installing large gaskets 240 as shown in FIG. 24. The second function is to push small gaskets 230 into small hose coupling 200 from the end having small male threads 432.

Plunger 462 and plunger stop 464 (FIG. 23) in shaft tunnel 468 (FIG. 22) cooperate with interior portion of large gasket 240 to align the same with the gasket cavity 242 in large hose coupling 210. A small amount of friction is used to retain gasket 240 onto large gasket cradle 458 near or at plunger 462. This friction area is minimized so when gasket 240 is installed in the large hose coupling 210, friction on the outside of the hose gasket 240 will be more than the friction holding gasket onto the large gasket cradle 458 near or at plunger 462. Then when gasket 240 is installed into the hose cavity 242, the large gasket 240 will stay in the cavity 242.

Handle 500 is hollow in order to provide a storage cavity 190 to hold spare gaskets 240 or 230. End twist knuckle 520 shows flat sides which keep handle 500 from rolling away. Flat end 522 permits handle 500, and thence storage cavity 190 (FIG. 4) to be stood upright if desired. Extra mass is left in the handle 500 at flat end 522 to lower the center of gravity of the handle 500 to help keep multi-faceted tool 400 upright if that is what is desired. This extra mass may or may not be added. If handle 500 is magnetized; either of itself or by having magnet attached thereto; positioning thereof, especially in an upright position can be enhanced. Handle 500 may also be made bigger or longer to increase storage capacity of the storage cavity 190.

Figure 22:
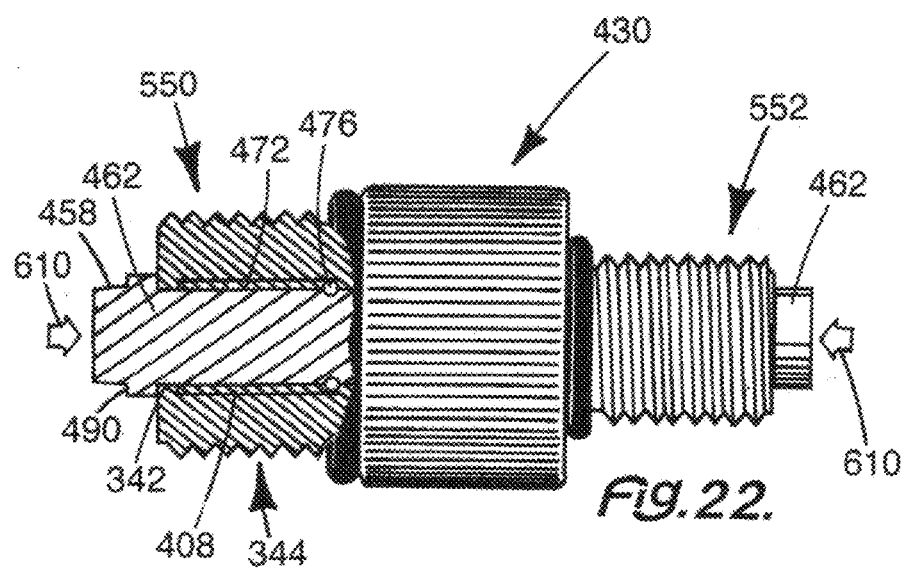
FIG. 22 depicts a partially cross-sectioned view of gasket installer guide 430 visually explaining plunger 462 and its travel track 472 which limits the travel of plunger 462, and cooperates with travel o-ring 476 to plunger 462 from detaching from the gasket installer guide 430.

With FIG. 22, gasket installer guide 430 is depicted. Travel o-ring 476 is used to retain plunger 462 inside the gasket installer guide 430. Travel track 472 for travel o-ring 476 define a range within which travel o-ring 476 can move. The length of travel track 472 dictates how much travel the plunger 462 will have. Oppositely disposed from large gasket tool end 550 is small gasket tool end 552. Plunger 462 protrudes therefrom. Thus the travel of plunger 462 becomes clear. Plunger 462 can operate with push direction 610 from either end.

Figure 23:
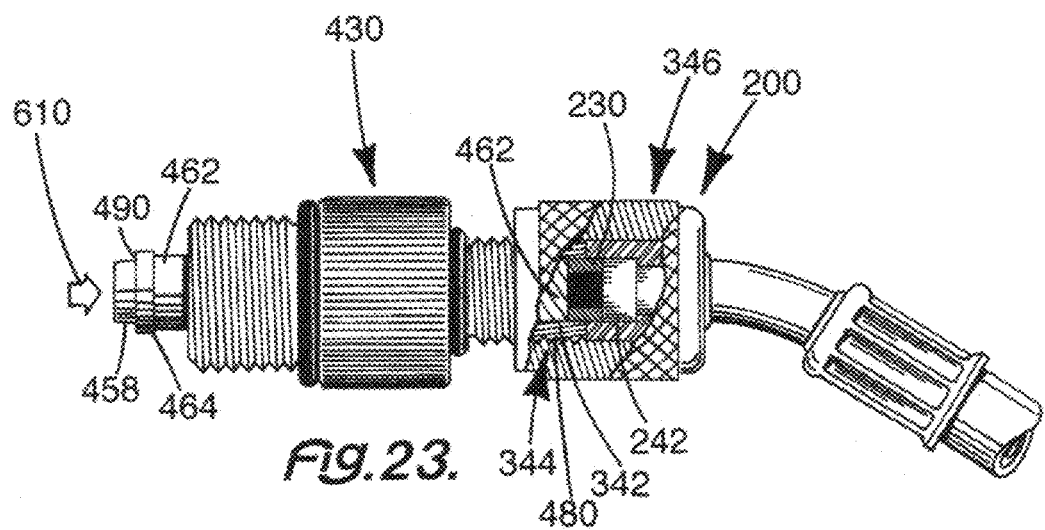
FIG. 23 depicts a partially cross-sectioned view of small hose coupling 200 with small hose gasket 230 being installed using gasket installer guide 430, wherein plunger 462 is pushed by any means thereby exerting push motion direction 610 shown by an arrow, which uniformly inserts small gasket 230 into place of the small hose coupling 200.
Figure 24:
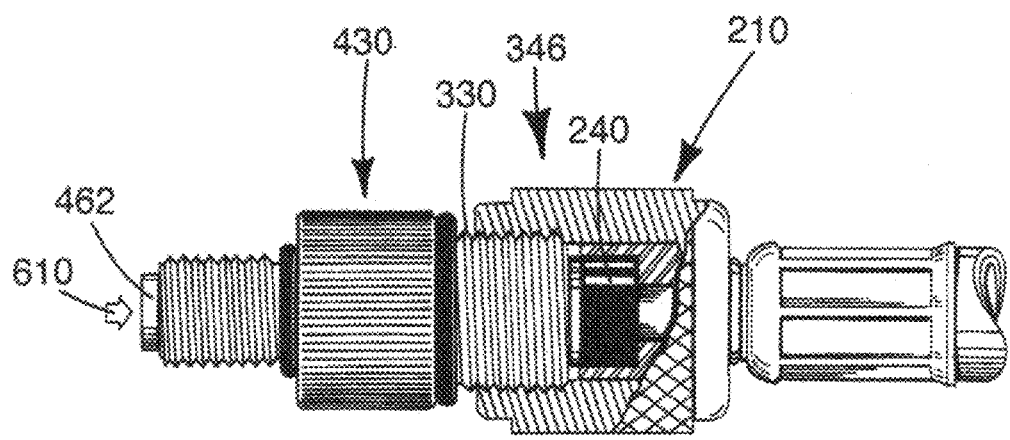
FIG. 24 depicts a reverse perspective view of FIG. 23 using the opposite end of gasket installer guide 430, to show partially cross-sectioned section of large hose coupling 210 with large hose gasket 240 being installed using gasket installer guide 430, while having plunger 462 pushed by any means to exert push motion 610 shown by arrow which uniformly inserts large gasket 240 into place within the large hose coupling 210.

Adding FIG. 23 to FIG. 22, plunger 462 is used when large gaskets 240 or small gaskets 230 are to be installed. Cut-a-way of tool end 344 at large gasket tool end 550 for the gasket installer guide 430 illustrates the movement of plunger 462 in travel track 472 of large gasket tool end 550, and also shows tool aperture 342 to facilitate gasket movement. Plunger 462 is placed into the gasket installer guide 430 at large gasket tool end 550 of gasket installer guide 430. Large gasket cradle 458 near or at plunger 462 may have an incline or be slightly tapered to lessen friction and to make a tool such as gasket installer guide 430 work well with gaskets from different manufacturers, since gaskets can vary from manufacturer to manufacturer.

Plunger 462 is pressed at push motion 610 to seat a gasket, such as large gasket 240 or small gasket 230 into a cavity, such as gasket cavity 242. Plunger 462 provides a vertical alignment of the gasket as well as retaining gasket onto the large gasket cradle 458 near or at plunger 462. Large gasket seat 490 provides horizontal alignment and large gasket cradle 458 near or at plunger 462 cooperate to provide vertical alignment of the large gasket 240. Large gasket seat 490 provides a flat surface to allow large gasket 240 to be pushed into gasket cavity 242. In fact, plunger 462 can be pushed from either end, which is determined by whether a large gasket 240 or a small gasket 230 is being installed.

FIG. 23 shows the gasket installer guide 430 being used to install a small hose gasket 230 into gasket cavity 242 within small hose coupling 200. Gasket 230 is placed into an aperture of small male threads 432. Main fitting is screwed into small hose coupling 200. Plunger 462 uses push motion 610 to move a gasket out of the back side of the gasket installer guide 430. Plunger 462 can be pressed in push motion 610, thereby injecting a perfectly aligned gasket into the gasket cavity 242 inside of hose coupling 200. It is also possible to install small hose gasket 230 and valve core depressor 532 at the same time if desired.

In FIG. 24, a main fitting of gasket installer guide 430 is being used to install a large hose gasket 240 into the gasket cavity 242 of hose coupling 210. To install a large gasket 240, the gasket 240 is placed onto the large gasket cradle 458 near or at plunger 462 (FIG. 23). This aligns the gasket for installation. After screwing main fitting of gasket installer guide 430 into hose coupling 210, one can press the plunger 462 in push direction 610 to press gasket 240 into gasket cavity 242 of the hose coupling 210.

Figure 25:
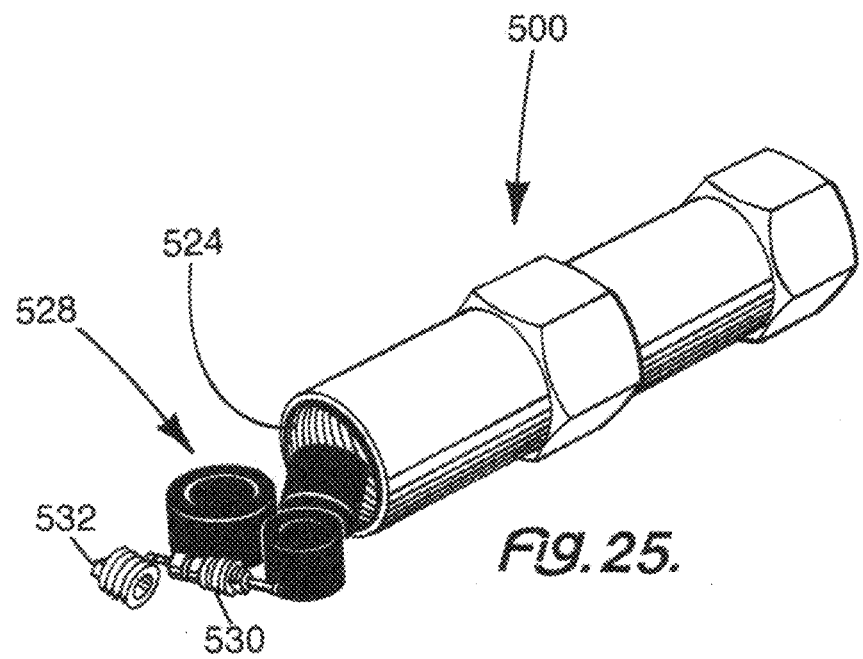
FIG. 25 depicts a front, perspective view of a container or a handle 500 with miscellaneous stored parts 528.

Within FIG. 25 is a multiple storage cavity 524 (similar to, but usually larger than storage cavity 190 of FIG. 4) for gasket installer guide 430 large enough to hold large gaskets 240, small gaskets 230, valve cores 530 and depressors 532; which are all industry standard items needed during air conditioning or refrigeration service.

Figure 26:
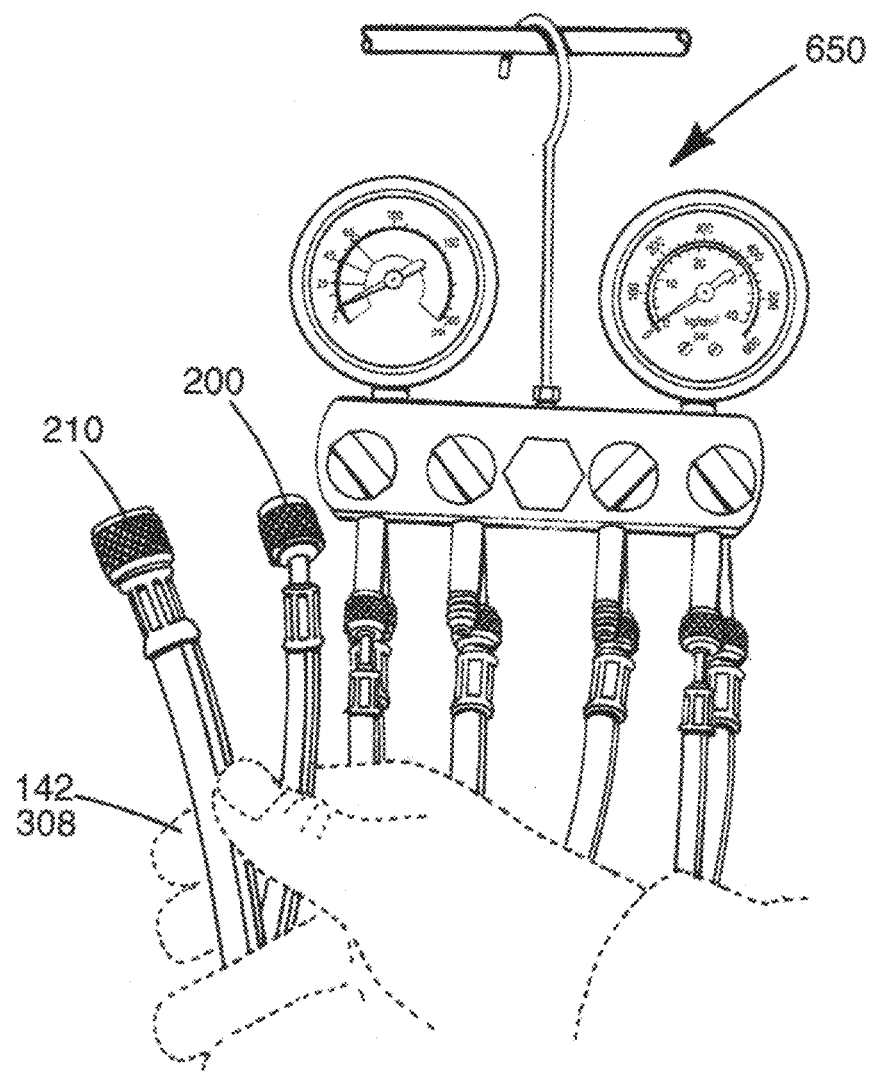
FIG. 26 depicts a mechanical manifold gauge system 650 requiring the gasket installer wrench 100, the small gasket installer guide tool 300 and the large gasket guide tool 310, or the multi tool 400 all of this invention to accommodate the two size fittings used on the mechanical manifold gauge system 650.

FIG. 26 shows what an industry standard gauge set 650 looks like. This is one of many designs on the market. Both small hose coupling 200 and large hose coupling 210 are shown in hand 142, shown with phantom lines 308. The reference to phantom lines 308 refers to the dashed shown for every phantom member in the drawings of this application.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A gasket installer wrench comprising:
a housing having a small gasket saddle at one end thereof;
the housing having a large gasket saddle adjacent the small gasket saddle;
the small gasket saddle being capable of supporting a small gasket for installation;
the large gasket saddle being capable of supporting a large gasket for installation;
the housing supporting a grasping collet at one end thereof;
the large gasket saddle being near the grasping collet;
a gripping device being on the housing at a second and opposing end of the housing;
the small gasket saddle being adjacent to the grasping collet;
the small gasket saddle being between the large gasket saddle and the grasping collet;
the grasping collet being capable of removing or inserting a valve core;
the grasping collet having a core wrench;
the small gasket saddle having a small base adjacent to the large gasket saddle;
the large gasket saddle having a large base on the housing cooperating with the large gasket saddle;
the small gasket saddle being oppositely disposed from the large gasket saddle;
the small gasket saddle being tapered with a larger small taper diameter at the small base to facilitate applying the small gasket thereto or inserting the small gasket therefrom;
the large gasket saddle being tapered with a larger large taper diameter at the large base to facilitate applying a large gasket thereto or inserting a large gasket therefrom;
the core wrench being removably attached to the housing;
the core wrench including a core gripper for a valve core;
the gasket installer wrench being formed from a plastic, a composite material, or a metal;
the housing including a knurled surface to increase a grip on the gasket installer wrench;
the small gasket having a small horizontal axis and a small vertical axis;
the large gasket having a large horizontal axis and a large vertical axis;
the small gasket saddle serving to adjust the small horizontal axis and the small vertical axis of the small gasket for easy insertion;
the large gasket saddle serving to adjust the large horizontal axis and the large vertical axis of the large gasket for easy insertion;
the housing including a storage cavity oppositely disposed from the small gasket saddle; and
a storage plug cap fitting into an aperture on the housing to close the storage cavity when desired.

* * * * *